No. 12,800. REISSUED MAY 26, 1908.

E. E. FLORA.

METAL BOUND BOX.

APPLICATION FILED MAR. 25, 1908.

2 SHEETS—SHEET 1.

Witnesses:

John Enders

Chas. H. Buell.

Inventor:

Ellsworth E. Flora.

By Dyrenforth, Lee, Christton & Wilson,

Attys.

No. 12,800. REISSUED MAY 26, 1908.

E. E. FLORA.

METAL BOUND BOX.

APPLICATION FILED MAR. 25, 1903.

2 SHEETS—SHEET 2.

Witnesses:

John Endure

Chas. H. Buell.

Inventor:

Ellsworth E. Flora.

By Dyrenforth, Lee, Christton & Stiles.

Attys.

UNITED STATES PATENT OFFICE.

ELLSWORTH E. FLORA, OF CHICAGO, ILLINOIS, ASSIGNOR OF ONE-HALF TO W. E. ROTHERMEL, OF CHICAGO, ILLINOIS.

METAL-BOUND BOX.

No. 12,800. Specification of Reissued Letters Patent. Reissued May 26, 1908.

Original No. 881,785, dated March 10, 1908, Serial No. 370,484. Application for reissue filed March 25, 1908. Serial No. 423,277.

*To all whom it may concern:*

Be it known that I, ELLSWORTH E. FLORA, a citizen of the United States, residing at Chicago, in the county of Cook and State of Illinois, have invented a new and useful Improvement in Metal-Bound Boxes, of which the following is a specification.

My invention relates to an improvement in the construction of boxes of the kind formed, for economy in manufacture and transportation, of light and cheap material, as veneer or fiber-board, and which are usually wire-bound to reinforce them. This variety of box is more or less unsightly because of the wires, which, moreover, present points at their twisted ends and at ends produced by breaking them in handling, which tend to lacerate the hands and tear the clothing of those whose duty it is to handle them; and to further reinforce this box against too great flimsiness and afford fastening means for the box-ends, it is provided with strengthening-cleats secured to the inner surfaces of the sides, bottom and lid, near their ends, transversely thereof, by the staples which fasten the wires in place, these cleats adding materially to the weight of the box and to the expense of manufacturing and shipping it.

My object is to provide a novel construction of metal-bound box of the variety referred to, which shall present all of the advantages, in an augmented degree, of the wire-bound article, and avoid all of the disadvantages of the latter. This object is accomplished by the construction illustrated in the accompanying drawings, in which—

Figure 1:
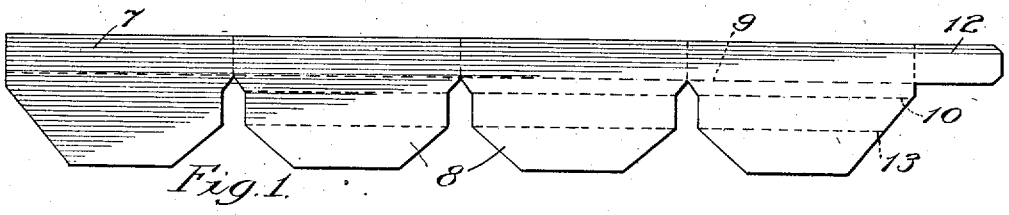
Figure 2:
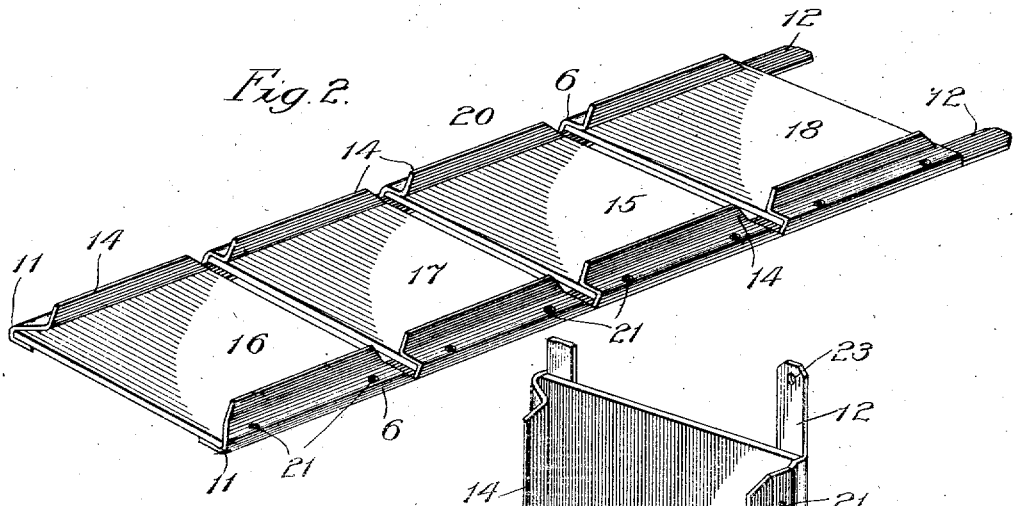
Figure 3:
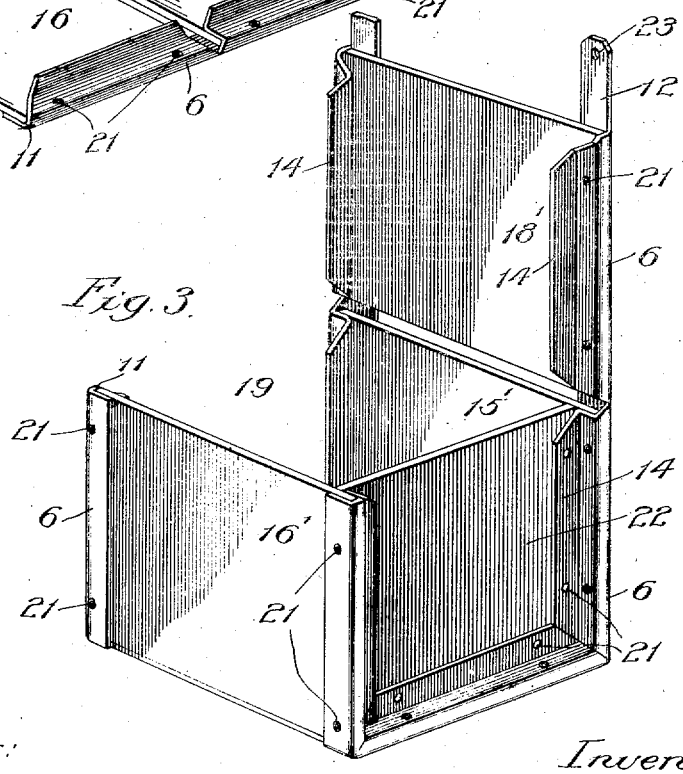
Figure 4:
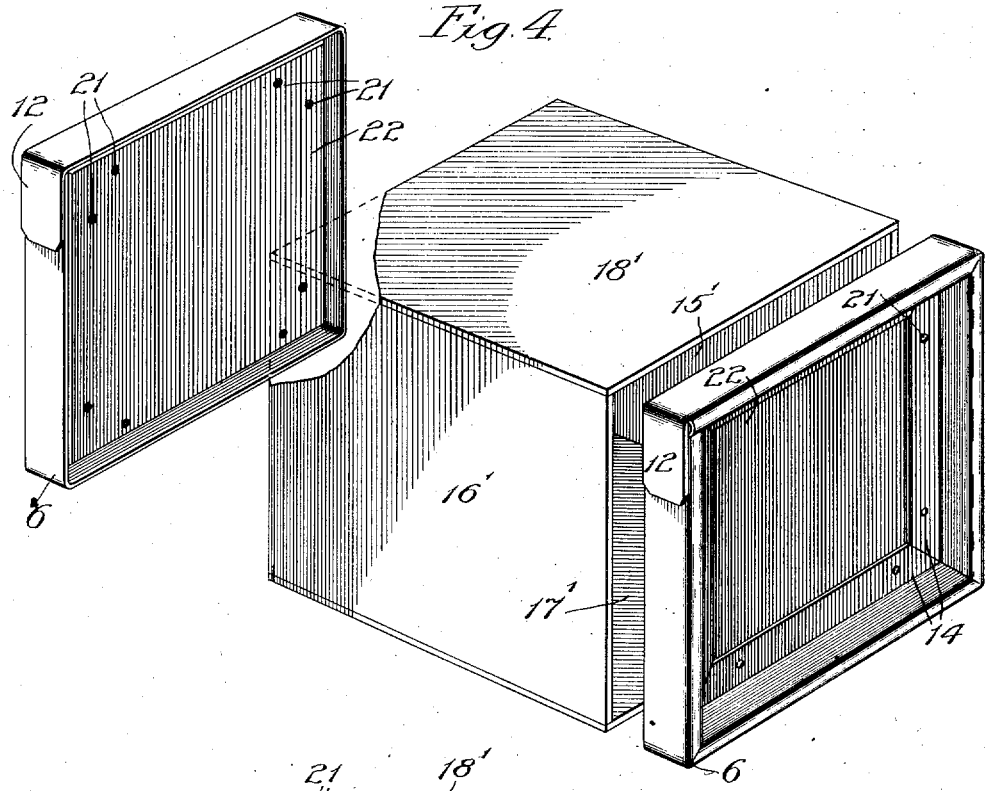
Figure 5:
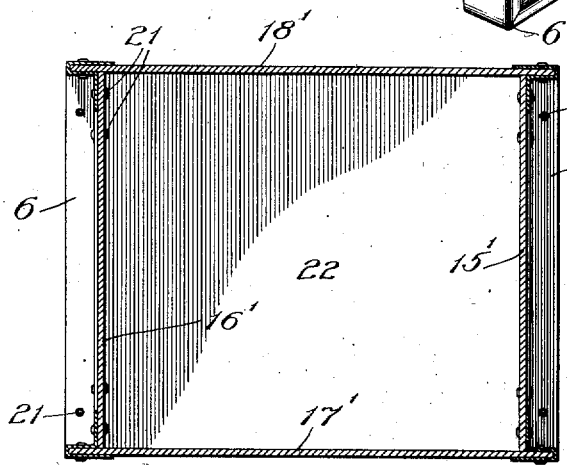

Figure 1 is a plan view of the blank from which my improved sheet-metal binding strip is formed by folding it along the dotted lines on the figure; Fig. 2, a perspective view of the box-blank provided along its lateral edges with my binding-strip; Fig. 3, a similar view of a box of my improved construction, with the lid raised and one end omitted; Fig. 4, a broken perspective view of the box, with its body-portion and ends in unassembled relation, illustrating an alternative manner of equipping it with my improved binding strips; and Fig. 5, a view of the completed box in cross-sectional elevation, with the lid fastened down.

The binding-strip 6 is composed of flexible sheet-metal, preferably tin and in a continuous length, formed, as by stamping, of an unmutilated rectangular section 7, with four similar lips, 8, extending laterally from it, and spaced apart, the end-lips having beveled outer edges, and their inner edges and the edges of the intermediate lips being cut away, as represented, to separate them. The blank is folded along the dotted lines at 9, 10, to produce an approximately U-shaped trough 11 with an end-tongue 12 extending from one side of the trough; and the lips are bent along the dotted lines 13 to extend their beveled-end sections at right angles to the trough as flanges 14.

Sheets 15, 16, 17 and 18, of veneer, or of fiber-board, or other analogous material, of proper dimensions to form the sides $15^1$, $16^1$, the bottom $17^1$ and the top or lid $18^1$, of a box 19, have applied to their ends these binding strips 6 by introducing the ends into the trough 11 to produce the blank 20 shown in Fig. 2, and the strips are firmly secured to the sheets, preferably by eyelets 21 punched through the trough-sections of the strips and through the sheets near their edges. Thereupon the blank is folded, by bending the binding-strips to extend the respective sheets, except the sheet 18, at right angles to each other into box-form, as represented in Fig. 3, with the flanges 14, projecting inwardly to present abutments of the box-ends 22, 22, which are thereupon inserted into place and fastened to the flanges, as by eyelets 21, punched through them and through the ends. When the lid $18^1$ is bent into place to cover the box, the flanges 14 thereon are similarly fastened to the box-ends; and the tongues 12 are bent over the side $16^1$ and fastened through holes 23 provided in them, which may coincide with the upper eyelet-holes 21 in that side and be fastened through these coincident holes in any suitable manner, as by eyelets, seals, or the like.

If preferred, the alternative method of assembling the parts of the box, illustrated in Fig. 4, may be employed. This consists in bending the binding-strips 6 into the cross-sectional shape of the box and applying and fastening, preferably by means of eyelets, the box-ends 22 to the flanges 14 to form the ends into covering-caps, and thereupon applying these caps to the sheets of material, which may be preparatorily assembled into box-form for the purpose, by introducing their ends into the trough-sections 11 of the strips and fastening the strips and sheets together, preferably by punching eyelets through them, as in the case of the first-described method of assembling.

Of course the shape of the box may, without departure from my invention, vary from that herein shown and described, when the shape of the binding-strips will vary correspondingly.

What I claim as new and desire to secure by Letters Patent is—

1. A metal-bound box comprising a body-portion formed of sheet-material, sheet-metal binding strips formed with single trough-shaped sections, in which the edge-portions of the sheet-material are contained and secured, flanges projecting from the inner edges of said trough-sections and forming box-end abutments, and box-ends abutting against and secured to said flanges.

2. A metal-bound box comprising a body-portion formed of sheet-material, sheet-metal binding-strips formed with single trough-shaped sections, in which the edge-portions of the sheet-material are contained and secured, each said section being divided transversely at intervals along the inner side of the trough at points of bending it to conform to said body-portion, and the divisions of the trough-sections having flanges projecting at right-angles thereto immediately from the edges to form box-end abutments, and box-ends abutting against and secured to said flanges.

3. A metal-bound box comprising a body-portion having its sides, bottom and lid formed of separate sections of sheet-material, binding-strips composed of sheet-metal bent into single trough-shaped sections, in which the edge-portions of the sheets are contained and secured, as by eyelets, each trough-section being divided transversely at intervals along its inner side at points of bending it to conform to said body-portion, and the divisions of the trough-sections having flanges projecting at right-angles thereto immediately from their edges, and box-ends abutting against and secured to said flanges.

4. A metal-bound box comprising a body-portion formed of sheet-material, sheet-metal binding-strips formed with single trough-shaped sections having end-lips, in which sections the edge-portions of the sheet-material are contained and secured, each said section being divided transversely at intervals along the inner side of the trough at points of bending it to conform to said body portion, and the divisions of the trough-sections having flanges projecting at right-angles thereto immediately from their edges to form box-end abutments, and box-ends abutting against and secured to said flanges.

ELLSWORTH E. FLORA.

In presence of—

R. A. RAYMOND,
W. T. JONES.